US011858319B2

(12) United States Patent
Faizan et al.

(10) Patent No.: US 11,858,319 B2
(45) Date of Patent: Jan. 2, 2024

(54) AUTOMATIC SUNVISOR ASSEMBLY

(71) Applicant: Mirza Faizan, Irving, TX (US)

(72) Inventors: Mirza Faizan, Irving, TX (US); Mirza Rizwan, Patna (IN); Abdullah Hasani, Murphy, TX (US); Mustafa Hasani, Murphy, TX (US); Mariam Mansoor, Frisco, TX (US); Rizwan Mansoor, Frisco, TX (US); Madhalasa Iyer, Plano, TX (US); Sparsh Kamdar, Plano, TX (US); Umar Kateeb, Plano, TX (US); Saadia Asaf, Aligarh (IN); Mansoor Hasan Khan, Aligarh (IN)

( * ) Notice: Subject to any disclaimer, the term of this patent is extended or adjusted under 35 U.S.C. 154(b) by 189 days.

(21) Appl. No.: 17/411,931

(22) Filed: Aug. 25, 2021

(65) Prior Publication Data

US 2023/0061443 A1 Mar. 2, 2023

(51) Int. Cl.
*B60J 3/02* (2006.01)

(52) U.S. Cl.
CPC .................... *B60J 3/0213* (2013.01)

(58) Field of Classification Search
None
See application file for complete search history.

(56) References Cited

U.S. PATENT DOCUMENTS

| 5,044,687 A | * | 9/1991 | Abu-Shumays | ....... B60J 3/0208 296/97.4 |
| 5,158,334 A | * | 10/1992 | Felland | ...................... B60J 3/04 160/370.21 |
| 5,714,751 A | * | 2/1998 | Chen | .......................... B60J 3/04 359/601 |
| 7,095,332 B2 | * | 8/2006 | Shimamto | ........... B60R 25/1004 340/693.9 |
| 9,302,568 B2 | * | 4/2016 | Kim | .......................... B60J 3/04 |

FOREIGN PATENT DOCUMENTS

| DE | 4118393 C2 | * | 4/1995 | ............ B60J 3/0204 |
| KR | 20110063981 | * | 6/2011 | |

OTHER PUBLICATIONS

English language translation of KR 20110063981 (Year: 2011).*
Partial English language translation of DE 4118393 (Year: 1992).*

* cited by examiner

*Primary Examiner* — Joseph D. Pape

(57) ABSTRACT

An automatic sunvisor assembly for vehicle is disclosed. The automatic sunvisor assembly comprises sunvisor(s) positioned over the front seats of the vehicle, ambient light sensor positioned inside the vehicle adapted to sense the intensity of sunlight; a processor to collect and compare the intensity of sunlight sensed by the ambient sensors in real time; and two high-torque servo motors connected to each of the sunvisors to move the at least one sunvisor. The processor identifies the ambient light sensor sensing higher intensity of sunlight, generates signals, and transmits signals to the high-torque servo motor, and the signals received by the high-torque servo motor determines a direction of movement of the sunvisor.

9 Claims, 1 Drawing Sheet

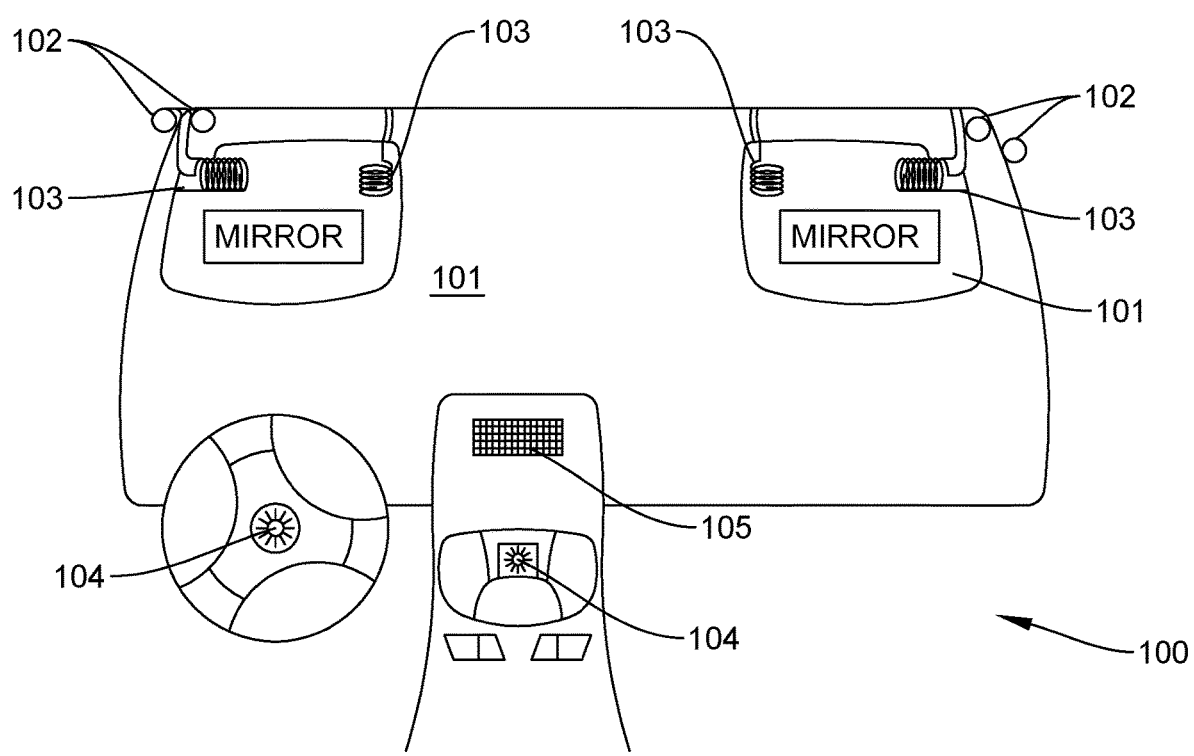

AUTOMATIC SUNVISOR ASSEMBLY

FIELD OF THE INVENTION

The present invention relates to sunvisor(s) assembly for vehicles, and particularly, automatic sunvisor(s) for vehicles capable of adjusting itself according to the direction of the sunlight, while letting the driver and the passenger prevent themselves (particularly head) from being hurt by the automatic movement of the sunvisor(s).

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

As is well known, the sun visor is installed on the ceiling surface (headlining) adjacent to the front glass in front of the driver's seat and front passenger's seat as a means for securing the driver's forward visibility by blocking sunlight, etc. flowing through the front glass of the vehicle. have.

Usually, the sun visor is rotatably installed in the front, rear, left, and right directions about the hinge point, and a manual operation method is applied in which a user directly holds the sun visor by hand and moves it to a desired position.

In other words, in order to cover the sunlight, the user must directly hold the sun visor, and then lower the sun visor to the glass, and subsequently rotate the sun visor according to the angle of inflow of the sun. There is some inconvenience.

Particularly, when the user is a driver, the visibility of the driver cannot be secured due to sunlight, and therefore, the user must take a steering wheel with one hand and rotate the sun visor directly with sunlight on the other hand. In terms of driving safety it can lead to very dangerous situations.

Therefore, there arises a need to provide automatic sunvisors that can be actuated without the need of the driving to move his/her hands from the steering in order to adjust the sunvisors, thereby reducing the risk of accident.

OBJECTIVE OF THE INVENTION

The present disclosure is aimed at providing an improved sunvisor(s) that automatically adjusts themselves according to the direction of the sunlight.

Another object of the present invention is to provide sunvisor(s) that can be actuated by the driver without moving hands from the steering wheel.

Yet another object of the present invention is to provide automatic sunvisor(s) that are simple in construction.

Yet another object of the present invention is to provide automatic sunvisor(s) adapted to alarm the driver and the passengers to adjust their head position temporarily so as to prevent themselves (particularly head) from being hurt by the automatic movement of the sunvisor(s).

SUMMARY OF THE INVENTION

This summary is provided to introduce a selection of concepts in a simplified format that are further described in the detailed description of the present disclosure. This summary is not intended to identify key or essential inventive concepts of the present disclosure, nor is it intended for determining the scope of the present disclosure.

According to an embodiment of the present disclosure, an automatic sunvisor assembly for vehicle comprises at least one sunvisor positioned over each of the front seats of the vehicle; at least one ambient light sensor positioned inside the vehicle, and adapted to sense the intensity of sunlight; a processor to collect and compare the intensity of sunlight sensed by each of the at least one ambient sensors in real time; and at least one high-torque servo motor connected to each of the at least one sunvisor to move the at least one sunvisor, wherein the processor identifies the ambient sensor sensing higher intensity of sunlight, generates signals, and transmits signals to the at least high-torque servo motor, and wherein the signals received by the at least one high-torque servo motor determines a direction of movement of the at least one sunvisor.

According to an embodiment, the at least one sunvisor is connected to a reach button adapted to actuate the operation of the sunvisor.

According to an embodiment, the automatic sunvisor assembly is powered by a battery in the vehicle.

According to an embodiment, the automatic sunvisor assembly comprises two sunvisors, and wherein one of the two sunvisors is positioned over a driver's seat and the other one of the two sunvisors is positioned over a passenger's seat.

According to an embodiment, the automatic sunvisor assembly (100) comprises a speaker (105) to raise alarm at the movement of at least one sunvisor (101).

According to an embodiment, the high-torque servo motor 103 moves the sunvisors (101) down from the roof to unlatch the sunvisor, and wherein the high-torque servo motor 103 moves the sunvisors (101) in left-right direction to the position where maximum sunlight is sensed.

According to an embodiment, the automatic sunvisor assembly comprises two ambient light sensors, and wherein one of the two ambient light sensors is positioned on top corner of windshield adjacent to roof of the vehicle, and the other one of the two ambient light sensors is positioned straight above the driver's seat.

According to an embodiment, the processor receives signals from the at least one ambient light sensor through a wire, converting the light into voltage or current.

According to an embodiment, the processor is actuated when ignition of the vehicle is turned on.

According to a further embodiment of the present invention, a method of operating an automatic sunvisor assembly in a vehicle comprises steps of sensing, by at least one ambient light sensor, intensity of sunlight falling on the sensor; comparing, by the processor, the intensity of sunlight falling on each of the at least one sensor in real time; generating, by the processor, commands to move at least one sunvisor to a location where maximum sunlight is falling; transmitting, by the processor to at least one high-torque servo motor connected to each of the at least one sunvisor, commands to move at least one sunvisor; and moving, by the at least one high-torque servo motor, the at least one sunvisor.

BRIEF DESCRIPTION OF DRAWINGS

To further clarify the advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 illustrates the overall arrangement of the automatic sunvisor assembly in a vehicle, according to an embodiment of the invention.

Further, skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF THE INVENTION

For the purpose of promoting an understanding of the principles of the invention, reference will now be made to the embodiment illustrated in the drawings, and specific language will be used to describe the same. It will nevertheless be understood that no limitation of the scope of the invention is thereby intended. Such alterations and further modifications in the illustrated system, and such further applications of the principles of the invention as illustrated therein would be contemplated as would normally occur to one skilled in the art to which the invention relates. Unless otherwise defined, all technical and scientific terms used herein have the same meaning as commonly understood by one of ordinary skilled in the art. The system, methods, and examples provided herein are illustrative only and are not intended to be limiting.

The term "some" as used herein is to be understood as "none or one or more than one or all." Accordingly, the terms "none," "one," "more than one," "more than one, but not all" or "all" would all fall under the definition of "some." The term "some embodiments" may refer to no embodiments or to one embodiment or to several embodiments or to all embodiments, without departing from the scope of the present disclosure.

The terminology and structure employed herein is for describing, teaching, and illuminating some embodiments and their specific features. It does not in any way limit, restrict or reduce the spirit and scope of the claims or their equivalents.

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "must comprise" or "needs to include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language such as "there needs to be one or more" or "one or more element is required."

Unless otherwise defined, all terms, and especially any technical and/or scientific terms, used herein may be taken to have the same meaning as commonly understood by one having ordinary skills in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not be necessarily taken as limiting factors to the attached claims. The attached claims and their legal equivalents can be realized in the context of embodiments other than the ones used as illustrative examples in the description below. Embodiments of the present invention will be described below in detail with reference to the accompanying drawings.

The present disclosure provides automatic sunvisor assembly 100 for vehicles capable of adjusting the sunvisor(s) 101 itself according to the direction of the sunlight. When driving, many drivers run into the issue of having the sun coming into their eyes. To address the problem, the sunvisor(s) 101 provided by the present invention prevent the driver from having to move their hands from the steering wheel to adjust the visor(s).

FIG. 1 illustrates the overall arrangement of the automatic sunvisor assembly 100 in a vehicle, according to an embodiment of the invention. The vehicle may be any four wheeler LMV or like HMV of this type where the sunvisors 101 are usually required. However, the present disclosure is being explained considering a motorcar as a vehicle, but the scope of the invention should not be limited to such embodiment. In an embodiment, the automatic sunvisor assembly 100 may comprise at least one sunvisor 101 positioned at the front end of the car hanging from the roof. The sunvisor(s)

101 may be rectangular in shape with one of the sides being hinged to the roof of the car such that the sunvisor(s) 101 are free to be longitudinally movable along the hinged connection. In a closed position, the sunvisors 101 may be folded along the roof of the car, while in the open position, the sunvisors 101 may be unfolded longitudinally so as to block the sunlight falling into the eyes of the driver and the passenger.

In an embodiment, the car may have two automatic sunvisor(s) 101 with one of them being positioned over the driver's seat and the over the co-passenger's seat by the roof. The sunvisor(s) 101 may be electrically powered by the battery in the car such that when the ignition is turned on, signals may be sent to the battery of the car. The visors may have a computer system controlling the operation thereof. The ignition of the car may also send signals to the computer system. On receiving the signals, the computer system may start up, or may be actuated.

In an embodiment, each of the sunvisor(s) 101 may be coupled to at least one reach button 104 for actuating the operation of sunvisor(s) 101. One of the reach buttons 104 may be positioned either near the climate control or on the steering wheel, depending on the car manufacturer's preference. Therefore, the position of the reach buttons 104 may vary, but preferably positioned so as to be within the reach of the driver in the car.

Referring to FIG. 1, the sunvisors 101 may be adapted to move longitudinally in an up-down direction to unlatch from the roof of the car, and sweep right-left to block the sunlight. Each of the sunvisor(s) 101 may be connected to two high-torque servo motors 103 (interchangeably used as motor) to swing on their own. One of the high torque servo motors 103 may move the sunvisor 101 down to unlatch it from the roof of the vehicle, while the other high torque servo motor 103 may move the sunvisor 101 left-right, according to the commands received from the processor.

There may be ambient light sensors 102, and preferably, one on top of the window in the car, in an embodiment and the other on the side of the window. The ambient light sensors 102 may be compact photoelectric sensors located on the inside of the car against the top corner of the windshield adjacent to the roof of the car. In another embodiment, there may be more sensors located directly above the driver and the passenger side windows. The ambient light sensors 102 may communicate with the computer system through a wire, converting the light into voltage or current. The computer system may receive the electrical signals and depending on the sensor 102 that is receiving the most light (or the equivalent voltage), the computer system (or processor) may translate said signals into commands and may send the command to the motor 103 which moves the sunvisor 101 to the optimal location that blocks the highest amount of sunlight.

In an exemplary embodiment, once the ignition is switched on, signals may be sent to the computer system to actuate the sunvisor(s) 101. If the driver now switches on the reach button 104, the sunvisor(s) 101 may be switched on (post receiving signal by the motor 103). The sunvisor(s) 101 may be folded down and get unlatched themselves. Once unlatched, the sunvisor(s) 101 may use signals from the ambient light sensors 102 on the windshield and windows, to decide where to move. Depending on the comparison between the intensity of sunlight falling on the various ambient light sensors 102, it may determine which location receives more sunlight and may send signal to the respective motor 103 for the respective movement of the sunvisor 101. In an exemplary embodiment, the more sunlight is falling at a certain angle of the car. Accordingly, the ambient light sensor 102 on top of window may sense more sunlight at a certain region and this may be communicated to the computer system through wire and then converted into voltage or current. The computer system may then translate said signals into commands and command the motor 103 to move the sunvisor(s) 101 to be at said location in left-right movement (or to only get unlatched) so as to block the sunlight falling at the said angle.

As the driver makes turns during the journey, the sunvisor(s) 101 may also automatically move, as they are still active by the reach button 104 being actuated by the driver. While moving, there may be instances where the direction of the sunlight relative to the car may vary. Since the ambient light sensors 102 sense the intensity of sunlight in real time, the changes in the readings may be sensed. Further, the other ambient light sensor 102, i.e., the ambient light sensor 102 on top of window may be sensing the intensity of sunlight in real time. Therefore, in case the ambient light sensors 102 sense more sunlight than the ambient light sensor 102 on top of window, the same may be communicated to the computer system and hence the motor 103 of the respective sunvisor 101 may be commanded.

Additionally, the sunvisor(s) 101 may be connected to at least one speaker 105 that may be mounted above the dashboard or anywhere else in the car, depending on the manufacturer's preferences. Each time, before the sunvisors 101 move, the at least one speaker 105 may make a warning sound to allow the driver or passenger to adjust their head to and so avoid getting hit by the movement of the respective sunvisor(s) 101. The arrangement of the sunvisor(s) 101 and the also the speaker 105 may be such that both the driver's and the passenger's visors may have the ability to move, and the driver has the buttons 104 to release both visors (individually). In another embodiment, there may be a common reach button 104 for operating both the sunvisor(s) 101 at once by the driver.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the embodiments is by no means limited by these specific examples. Numerous variations, whether explicitly given in the specification or not, such as differences in structure, dimension, and use of material, are possible.

We claim:

1. An automatic sunvisor assembly for a vehicle, the automatic sunvisor assembly comprising:
   at least one sunvisor, wherein each sunvisor of the at least one sunvisor is positioned over a respective front seat of the vehicle;
   a plurality of ambient light sensors positioned inside the vehicle, wherein the plurality of ambient light sensors is configured to detect intensities of light coming from different directions;
   a processor configured to:
      receive the intensities of light detected by the plurality of ambient light sensors;

select a specific ambient light sensor from the plurality of ambient light sensors based on a comparison of an intensity of light detected by the specific ambient light sensor and an intensity of light detected by each of a set of ambient light sensors other than the specific ambient light sensor, wherein
  the intensity of light detected by the specific ambient light sensor is maximum among the intensities of light detected by the plurality of ambient light sensors, and
  the plurality of ambient light sensors includes the set of ambient light sensors;
generate signals indicating the selected specific ambient light sensor; and
transmit the generated signals to at least two servo motors; and
the at least two servo motors connected to each sunvisor of the at least one sunvisor, wherein the signals received by the at least two servo motors determine a direction of movement of a corresponding sunvisor of the at least one sunvisor.

2. The automatic sunvisor assembly as claimed in claim 1, wherein the at least one sunvisor is connected to a reach button adapted to actuate an operation of the at least one sunvisor.

3. The automatic sunvisor assembly as claimed in claim 1, wherein the automatic sunvisor assembly is powered by a battery in the vehicle.

4. The automatic sunvisor assembly as claimed in claim 1, wherein the automatic sunvisor assembly comprises a speaker to raise alarm at the movement of the at least one sunvisor.

5. The automatic sunvisor assembly as claimed in claim 1, wherein a first servo motor of the at least two servo motors moves a sunvisor of the at least one sunvisor down from a roof of the vehicle, and wherein a second servo motor of the at least two servo motors moves the sunvisor of the at least one sunvisor in left-right direction to a position where maximum sunlight is sensed.

6. The automatic sunvisor assembly as claimed in claim 1, wherein a first ambient light sensor of the plurality of ambient light sensors is positioned on a top corner of a windshield adjacent to a roof of the vehicle, and second ambient light sensor of the plurality of ambient light sensors is positioned straight above driver's seat.

7. The automatic sunvisor assembly as claimed in claim 1, wherein the processor receives signals from the plurality of ambient light sensors through a wire, converting the light into voltage or current.

8. The automatic sunvisor assembly as claimed in claim 1, wherein the processor operates when ignition of the vehicle is turned on.

9. A method of operating an automatic sunvisor assembly in a vehicle, the method comprising:
  sensing, by a plurality of ambient light sensors, intensities of light falling on the plurality of ambient light sensors;
  receiving, by a processor, the intensities of light sensed by the plurality of ambient light sensors;
  selecting, by the processor, a specific ambient light sensor from the plurality of ambient light sensors based on a comparison of an intensity of light sensed by the specific ambient light sensor and an intensity of light sensed by each of a set of ambient light sensors other than the specific ambient light sensor, wherein the
    intensity of light sensed by the specific ambient light sensor is maximum among the intensities of light sensed by the plurality of ambient light sensors, and
    the plurality of ambient light sensors included the set of ambient light sensors;
  generating, by the processor, signals indicating the selected specific ambient light sensor; and
  transmitting, by the processor, the generated signals to at least two servo motors connected to each sunvisor of at least one sunvisor, wherein the signals received by the at least two servo motors determine a direction of movement of a corresponding sunvisor of the at least one sunvisor.

* * * * *